United States Patent [19]

Pommier et al.

[11] Patent Number: 5,191,576
[45] Date of Patent: Mar. 2, 1993

[54] METHOD FOR BROADCASTING OF DIGITAL DATA, NOTABLY FOR RADIO BROADCASTING AT HIGH THROUGHPUT RATE TOWARDS MOBILE RECEIVERS, WITH TIME FREQUENCY INTERLACING AND ANALOG SYNCHRONIZATION

[75] Inventors: Daniel Pommier, Breal Sur Montfort; Bernard LeFloch, Rennes, both of France

[73] Assignees: Etat Francais and Telediffusion de France S.A., France; Etat Francais and Telediffusion de France S.A., France

[21] Appl. No.: 777,463

[22] Filed: Oct. 17, 1991

[30] Foreign Application Priority Data

Nov. 18, 1988 [FR] France .................. 88 15216

[51] Int. Cl.⁵ .............. H04J 11/00; H04L 27/28
[52] U.S. Cl. ........................ 370/18; 370/21; 370/50; 370/69.1; 370/70; 375/38; 375/58; 455/59
[58] Field of Search .............. 370/18, 19, 21, 23, 370/50, 69.1, 70, 100.1, 101, 105.4, 105.5, 111; 375/38, 40, 58, 60, 99, 101, 107, 108, 111, 112, 113; 455/50, 54, 59, 63; 358/12, 142, 143; 381/2, 13, 14; 371/43, 46

[56] References Cited

U.S. PATENT DOCUMENTS

| | | | |
|---|---|---|---|
| 3,605,019 | 9/1971 | Cutter et al. | 370/70 |
| 4,638,478 | 1/1987 | Hatabe | 370/101 |
| 4,799,241 | 1/1989 | Laurent | 375/113 |
| 4,884,139 | 11/1989 | Pommier | 358/142 |
| 4,922,483 | 5/1990 | Kobayashi | 370/50 |

FOREIGN PATENT DOCUMENTS

| | | |
|---|---|---|
| 1443881 | 5/1966 | France . |
| 88/00417 | 1/1988 | PCT Int'l Appl. . |
| 703247 | 2/1954 | United Kingdom . |

OTHER PUBLICATIONS

Adaptive Slow Frequency-Hopping System for Land Mobile Radio-I. Sabbagh, B.Sc., M.Sc., and D.G. Appleby, B.Sc. (Engl), C.Eng. M.I.E.E., IEE Proceedings, vol. 132, Pt.F. No. 5, Aug. 1985.

PC Communications: The Revolution is Coming, Feature, Brig. Gen. H. R. Johnson, USAF (Ret.).

Pommier, et al., "New Prospects for High Quality Digital Satellite Sound Broadcasting to Mobile, Portable, and Fixed Radio Receivers," IBC '88 Brighton, 23-27 Sep. 1988 (IEE Conference Publication No. 293).

Principles of Digital Communication and Coding, Viterbi and Omura, McGraw-Hill, 1979, pp. 78-83, 150-159, 242-253.

Viterbi, "Convolutional Codes and Their Performance in Communication Systems", IEEE Transactions on Communications Technology, vol. Com-19, No. 5, Oct. 1971.

*Primary Examiner*—Benedict V. Safourek
*Assistant Examiner*—Alpus H. Hsu

[57] ABSTRACT

A method for the diffusion of digital data designed to be received notably by mobile receivers moving in an urban environment, that is, in the presence of stray signals and jamming, and in conditions of multiple propagation (Rayleigh process) Providing an optimized mode of setting up the frame structure of the broadcast signal, so as to derive the maximum benefit from the resistance of the system to pulsed stray signals and to jamming. The header of each frame has a first empty synchronization symbol and eventually a second, unmodulated wobbled signal forming a two-stage analog synchronization system. So, the recovery of synchronization is achieved in an analog way, without prior extraction of a clock signal at the binary level. The constitution of the sequence of the useful symbols in the frame results from temporal and sequential interlacing operations, combined to obtain an implicit de-interlacing at the receiver. The empty symbol may be further used for the extraction of the jamming affecting the transmission channel.

13 Claims, 5 Drawing Sheets

1st STAGE OF SYNCHRONIZATION

2nd STAGE OF ANALOG SYNCHRONIZATION

| ĩ | i=F(i) | i |
|---|---|---|
| 0 | 0 | |
| 1 | 256 | |
| 2 | 128 | 0 |
| 3 | 384 | 1 |
| 4 | 64 | 2 |
| 5 | 320 | 3 |
| 6 | 192 | 4 |
| 7 | 448 | 5 |
| 8 | 32 | 6 |
| 9 | 288 | 7 |
| 10 | 160 | 8 |
| 11 | 416 | 9 |
| 12 | 96 | 10 |
| 13 | 352 | 11 |
| 14 | 224 | 12 |
| 15 | 480 | 13 |
| 16 | 16 | |
| 17 | 272 | 14 |
| ⋮ | ⋮ | ⋮ |
| 495 | 495 | |
| 496 | 31 | |
| 497 | 287 | 434 |
| 498 | 159 | 435 |
| 499 | 415 | 436 |
| 500 | 95 | 437 |
| 501 | 351 | 438 |
| 502 | 223 | 439 |
| 503 | 479 | 440 |
| 504 | 63 | 441 |
| 505 | 319 | 442 |
| 506 | 191 | 443 |
| 507 | 447 | 444 |
| 508 | 127 | 445 |
| 509 | 383 | 446 |
| 510 | 255 | 447 |
| 511 | 511 | |

METHOD FOR BROADCASTING OF DIGITAL DATA, NOTABLY FOR RADIO BROADCASTING AT HIGH THROUGHPUT RATE TOWARDS MOBILE RECEIVERS, WITH TIME FREQUENCY INTERLACING AND ANALOG SYNCHRONIZATION

This application is a continuation of application Ser. No. 07/439,275, filed Nov. 20, 1989, now abandoned.

BACKGROUND OF THE INVENTION

1. Field of the Invention

The field of the invention is that of the broadcasting of digital data designed to be received notably by moving receivers in an urban environment, namely in the presence of interferences or jamming, under conditions of multiple propagation (RAYLEIGH process) generating a phenomenon of fading.

The invention can be applied more particularly, but not exclusively, to a system of digital sound broadcasting as described in the French patent applications Nos. 86 09622 of Jul. 2, 1986 and 86 13271 of Sep. 23, 1986, on behalf of the same applicants. This system of digital broadcasting, presented in these prior patent applications, is based on the combined use of a channel coding device and a method known as the COFDM system (coding orthogonal frequency division multiplex system).

2. Description of the Prior Art

The modulation method proper of this prior art system consists in providing for the distribution of the constituent digital elements of the data signal in the frequency-time f-t space and in simultaneously emitting sets of digital elements on M parallel broadcasting channels by means of a multiplex of orthogonal carrier frequencies. This type of modulation makes it possible to prevent two successive elements of the data train from being emitted at the same frequency. This enables the absorption of the fluctuating selectivity in frequency of the channel, by frequentially dispersing the initially adjacent digital elements during the broadcasting.

The prior art encoding method seeks, for its part, to enable the processing of the samples coming from the demodulator to absorb the effect of variation in amplitude of the signal received, due to the RAYLEIGH process. This encoding is advantageously a convolutive encoding, possibly concatenated with a REED-SOLOMON type encoding.

In a known way, the encoded digital elements are furthermore interlaced, in time as well as frequency, in order to maximize the statistical independence of the samples with respect to the Rayleigh process and the selective character of the channel.

SUMMARY OF THE INVENTION

An aim of the present invention is to provide an optimized embodiment of the frame structure of the broadcast signal so as to derive the maximum benefit from the self-synchronization properties of the COFDM method, and to maximize the resistance of the system to the pulsed interferences and jamming.

This aim as well as others which shall appear subsequently are achieved by means of a method for the broadcasting of digital data, notably for sound broadcasting at a high throughput rate towards mobile receivers, of the type providing for the distribution of said data in the form of digital elements in the frequency f/time t space and the emission of frames of symbols each formed by a multiplex of orthogonal carrier frequencies modulated by a set of digital elements and broadcast simultaneously on M parallel channels, wherein the recovery of synchronization of each frame received is achieved by analog synchronization means without prior extraction of a clock signal.

According to an advantageous characteristic of the invention, the header of each of said frames of symbols comprises an interval of silence, with the duration of a digital symbol of the frame. This symbol of silence is capable of being used as a means of synchronization of the demodulation and/or as a means of analysis of the pulsed noise and of the jamming which are characteristic of the channel.

According to another characteristic advantage of the invention, said frame header comprises an unmodulated multiplex of said M orthogonal carrier frequencies, with the duration of a digital symbol of the frame. This unmodulated symbol may be used as a synchronization means and/or as a phase reference for the J phase-modulated carriers of the digital train.

Preferably, said symbols are formed by means of a frequential interlacing operation using a reversible deterministic function, said function consisting in a method for shuffling the indices of said frequencies with a maximization of the dispersal of the frequencies associated with adjacent digital elements of the source data signal. Said shuffling of indices advantageously consists in applying a function of the bit inversion type to said binary encoded indices.

Preferably, the phase modulation done on the carriers is of the type with four phase states, each carrier being modulated by a pair of digital elements, and said pairs are formed by a source sequence of digital elements in forming packets of 2J consecutive elements in said sequence, and in associating the elements two by two in each packet according to a criterion of maximization of dispersal of the adjacent digital elements of the source sequence.

In an advantageous mode of the invention, the pairs are formed by splitting each of the said data packets into two half-packets and by pairing the same-order digital elements in each half-packet.

The frequential interlacing thus defined is advantageously combined with a temporal interlacing achieved by the application of delays, the value of which is assigned to each digital element by the application of a reversible function of the index of the digital element, the delay function (F) being such that the deinterlacing in the initial order and the recovery of each element of the source sequence are achieved by the application, to each digital element with a same index in the sequence received, of a complementary delay value with respect to the depth of the maximum interlacing of the delay function.

According to another characteristic of the invention, the method includes a jamming extraction process comprising the following steps:
- the received signal is analyzed during said symbol of silence, on the spectrum covered by the J orthogonal carriers;
- the frequencies affected by complex Gaussian noise are identified;
- a correction and/or cancellation processing is done of the useful signal received by said detected jammed signals.

Advantageously, said spectral analysis is complemented by a two-dimensional filtering step in the time-/frequency space, providing for a smoothing of the results of said analysis on the useful extent of the analyzed spectrum.

According to a complementary characteristic of the invention, the method is of the type implementing a convolutive encoding of the data at the transmitter, and a soft decision decoding through maximization of likelihood at the receiver, wherein said processing of correction and/or cancellation of the useful signal received for said detected, jammed signals consists in informing said soft decision making by means of the noise power detected at each of said frequencies.

BRIEF DESCRIPTION OF THE DRAWINGS

Other features and advantages of the invention will appear from the following description of an embodiment given by way of a non-restrictive example, and from the appended drawings, of which.

DESCRIPTION OF A PREFERRED EMBODIMENT

The different aspects of the embodiment which shall be described hereinafter more particularly concern digital sound broadcasting towards mobile receivers, as defined notably in the EUREKA Digital Audio Broadcasting (DAB) program.

However, it is clear that the high throughput digital broadcasting principle of the invention can be applied to any type of communications, notably in channels subjected to the Rayleigh process such as, for example, aircraft-satellite or other types of communications.

In the digital sound broadcasting application of the DAB, one aim may be, for example, the transmission of sixteen stereophonic programs in an 8 MHz wide frequency band with a digital throughput rate of the order of 100 kbits (after compression).

Figure 1:
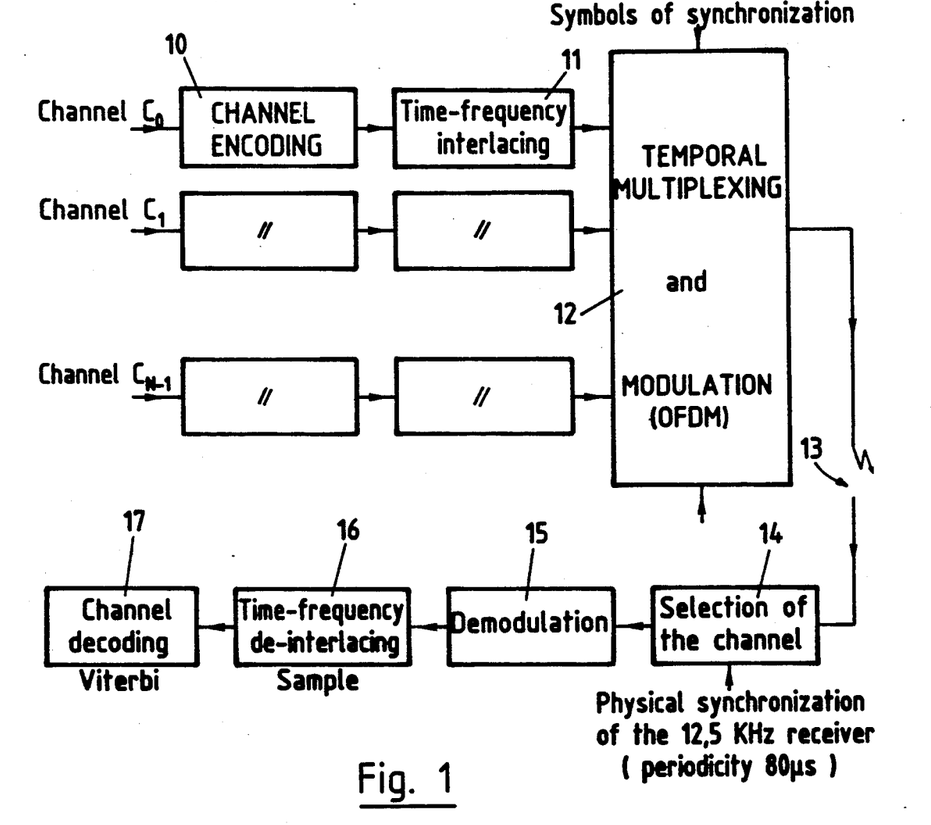
FIG. 1 is a block diagram of a transmission-reception chain implementing the method of the invention.

A transmission chain of the type described in the patent applications mentioned in the introduction is shown in FIG. 1.

Each of the N(16) channels $C_0$ to $C_{n-1}$ undergoes an encoding 10 in parallel, then a time-frequency interlacing 11 on a separate channel, before being subjected jointly to a process 12 of temporal multiplexing and OFDM modulation.

The encoding 10 is advantageously of the convolutive type. The time-frequency interlacing 11 is aimed at shuffling the digital elements of each channel in order to give them maximum independence with respect to interferences and to the jamming of the broadcasting channel 13.

The OFDM modulation consists in the modulation of symbols each formed by a multiplex of orthogonal frequencies broadcast simultaneously on J channels. This operation can be achieved by a Fourier transform on the encoded and interlaced digital sequence of each channel $C_i$.

By way of example, in an 8 MHz frequency band, it is possible to define 512 separate 15 625 Hz carrier frequencies. Of these, 448 are usable, after elimination of the central frequency of the spectrum and of the lateral carriers (⅛th of the spectrum) to take the filtering constraints into account.

The reception chain comprises the steps of channel selection 14, demodulation 15, frequency de-interlacing 16 and decoding 17 of the de-interlaced channel.

The channel selection operation 14 is performed advantageously by Fast Fourier Transform (FFT) so as to decimate the set of suitably interlaced carriers to apply the OFDM demodulation operation only to the carriers of the selected channel (see addition certificate No. 86 13721 already referred to). After the time-frequency de-interlacing 16, a "soft" decision Viterbi decoding 17 is advantageously applied.

Figure 2:
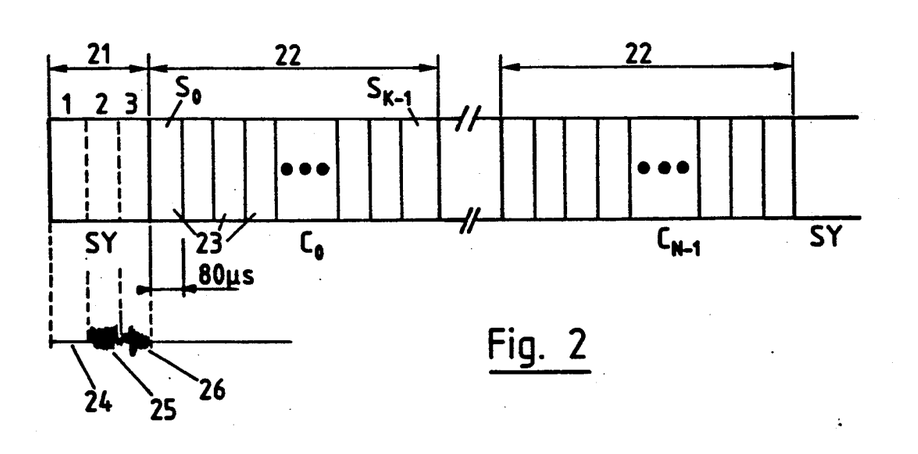
FIG. 2 gives a schematic view of the structure of a frame as broadcast by the system of the invention.

The data frame, as broadcast through the channel 13 presents, according to the invention, the structure of FIG. 2.

The frame is formed by a header 21 and N elementary channels 22 marked $C_0$ to $C_{n-1}$ each formed by K symbols 23, marked $S_0$ to $S_{k-1}$. Each symbol 23 is formed by a multiplex of J orthogonal carriers. Each channel $C_i$ represents a particular data flow independent of the information transmitted on the other channels.

The header 21 of the frame includes an "empty" or "blank" interval 24 which is advantageously used to perform both an analog synchronization of the frame and an extraction of the jamming of the broadcasting channel.

The possibility of achieving an analog synchronization recovery on an "empty" symbol is a fundamental characteristic of the invention.

Figure 3A:
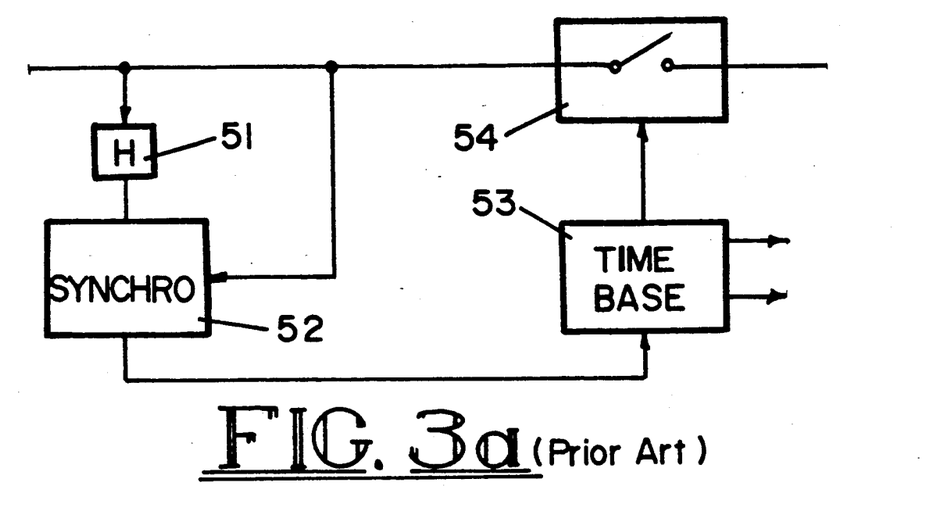
FIGS. 3a, 3b respectively give a schematic view of, firstly, a standard acquisition chain of synchronization by clock signal extraction and, secondly, the principle of analog recovery of synchronization with two stages according to the invention.

For, in existing systems working at a high throughput rate and as shown in FIG. 3a, the recovery of synchronization is usually achieved in synchronization at the binary level, on the received train, by means of a clock 51 working with synchronization means 52 with locking. The recovered synchronization drives a time base system 53 which opens windows 54 in the wave train received to extract the useful frames therefrom. This type of chain with locking of synchronization is made necessary by the need to work with very high precision, typically of the order of ±5 ns for throughput rates of 10 Mbits per second.

For equal throughput rates, the broadcasting method of the invention makes it possible to work with considerably lower precision during the recovery of synchronization. In effect, since each symbol is formed by a multiple of J orthogonal carriers, the synchronization is achieved on symbols with a width that is J times greater. Thus, in the case of the use of 448 carriers in parallel, the precision required at the recovery of synchronization is about 4.5 μs.

Figure 3B:
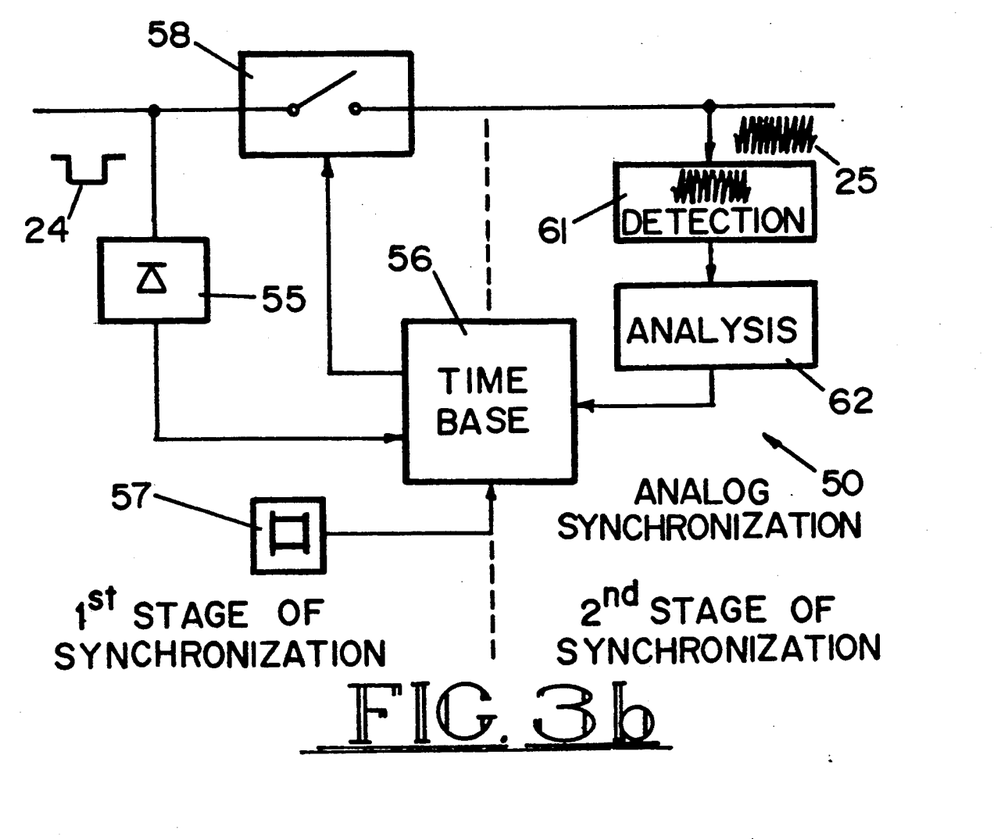

The assembly of FIG. 3b corresponds to the implementation of a two-stage synchronization by recovery of two successive symbols of synchronization. The first synchronization symbol recovered is the "blank" symbol 24 of the frame header 21. The detection of an envelope 55 of the blank symbol sets off the time base 56 which may be generated by a simple quartz-oscillator 57 at 12.5 kHz for symbols with a duration of 80 μs. The time base 56 opens windows 58 in the digital train received so as to recover the second recovery symbol 25.

This symbol is formed by an unmodulated multiplex of the J carrier frequencies. It advantageously takes the form of a wobbling on the entire spectrum covered by the carriers but may be formed by any multiplex with a substantially constant envelope.

The aim of the second stage of synchronization is to make a more precise resetting of the synchronization acquired at the first stage, by analysis of the pulse response of the channel. The self-correlation of the wobbled symbol 25 thus enables increased precision in synchronization to be obtained. The detection of an envelope 61 of the second synchronization signal, after analysis 62, resets the time base 56, and hence the sequencing of the window 58 openings in the wave train received. The recovery of this symbol, with a duration of 80 μs, accomodates a precision of ±2 μs, and is therefore compatible with an analog recovery chain.

The analysis of the pulsed response of the channel makes it possible to take into account echo phenomena for the synchronization. Furthermore, a safety interval is advantageously provided between each symbol of the frame, with a view to absorbing this echo effects and limiting the intersymbol interference phenomenon. The safety interval typically has a value of 16 μs, reducing the useful symbol period to 64 μs.

The synchronization symbols 24, 25 of the header 21 of the frame may further each have a distinct second function.

The blank symbol 24 may, in effect, serve to analyze the interferences and jamming that affect the transmission channel in order to take them into account, at the receiver, in the soft decision module as shall be seen further below.

The wobbled synchronization symbol may, for its part, serve as a phase reference for the decoding of the useful signals 23 of the frame. In effect, advantageously, the reference phase of each of the J carriers of the multiplex is locked in a distinct and specific way, so as to make it possible to restore each component of the multiplex to the receiver in differential demodulation. Advantageously, the locking of the reference phases is expressed by the formula:

$$\phi k = \pi k^2 / N$$

with k=0 to N: index of each frequency.
N: total number of frequencies of the multiplex (N=512 in the present example).

Any other mode of computation of the locking phases is suitable, provides that it makes it possible to discriminate the information conveyed by each of the carriers of the multiplex.

If necessary, the header 21 of the frame has a third symbol 26 which is a carrier of information such as the list of the local frequencies of emissions for the channel considered. A mobile receiver is then capable of getting automatically and permanently locked into the most powerful local transmitter, by means of a specific device for the analysis of this information.

In all, the principle of analog and implicit synchronization of the frames, in the invention, makes it possible to avoid the drawbacks of the existing systems using synchronization words that are recognized at the binary level (consumption of throughput, risks of poor recognition of the word, total loss of the frame in the event of synchronization error). This determining advantage is added on to the optional possibility of a bi-functional use of the symbols of synchronization, as has just been presented.

Figure 4:
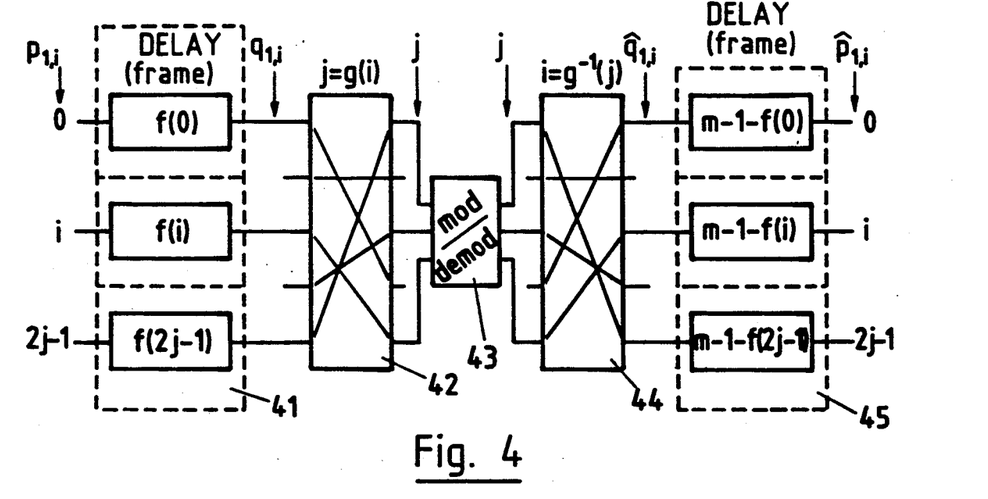
FIG. 4 gives a schematic view of a time-frequency interlacing/deinterlacing chain, optimal in cooperation with the synchronization principle of the invention.

The frame structure thus achieved results, according to the invention, from a dual operation of temporal interlacing and frequential interlacing of the source sequence (FIG. 4).

The number of binary elements per channel of one and the same frame coming to the input of the interlacing system depends on the number J of carriers per symbol, the number K of symbols per channel and the number of states of the modulation applied to each carrier. In the case of a modulation with four phase states, the size of the blocks $P_l$ of data (l designating the index of the frame) presented at each frame at the input of this system is 2·J·K bits.

By way of example, if J=448 and K=9 (k=0 to 8 designating the order number of the symbol in the channel), we obtain blocks $P_l$ of data equal to 8 064 bits.

Let $P_{l,i}$ be the index i bit of the block $P_l$ (i=0 to 2·J·K−1)

The temporal interlacing consists in forming a block $Q_l$, of the same size as $P_l$, the index i of which, marked $Q_{l,i}$ is defined as follows:

$$Q_{l,i} = P_{l-f(i),i}.$$

On the choice of the function f(.) depends the depth and efficiency of the interlacing. In general, the image of f is the set F={0,1 ..., m−1}, where m designates the temporal depth of the interlacing.

Figure 5:
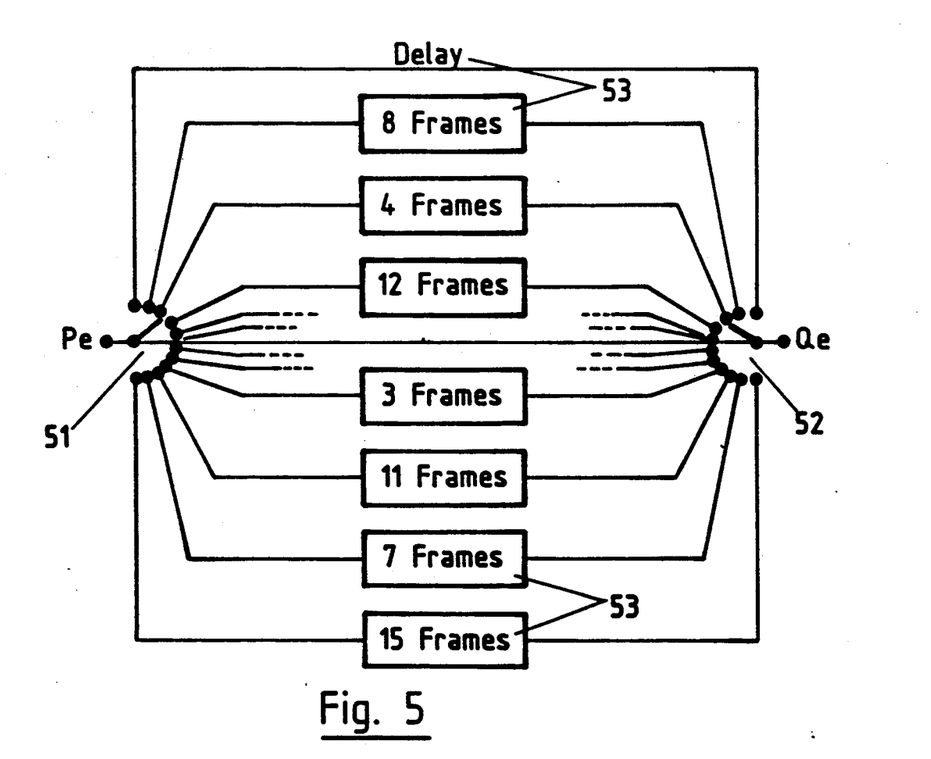
FIG. 5 shows an advantageous mode of a convolutive temporal interlacing that can be implanted in the chain of FIG. 4.

An example of an open-ended temporal interlacing is shown in FIG. 5. The example shown is of the type applying to a process with inversion of bits defined by the following interlacing function:

ñ: reciprocal number associated with n:
if n is a number varying from 0 to $2_{p-1}$, written in the form:

$$n = \sum_{i=0}^{p-1} n_i 2^i \quad n_i = 0 \text{ or } 1$$

the associated number ñ is equal to:

$$\tilde{n} = \sum_{i=0}^{p-1} n_i 2^{p-1-i}$$

The block $P_l$ is interlaced according to the diagram of FIG. 5 so as to form a block $Q_l$. The double changeover switch 81, 82 symbolizes the application of the interlacing function by successive switching over of each of the delay blocks 83. Let $q_{l-1}$ be the $i^{th}$ element of the block $Q_l$. We have the relationship:

$$q_{l-1} = P_{l-R(i/16),i}.$$

The depth of interlacing is therefore 16 frames.

Clearly, this example is given purely as a non-restrictive illustration.

The elements of the block $Q_l$ are assigned to the K symbols of the channel considered in the frame 1 as follows:

The block $Q_l$ is split up into K packets of 2J bits in ascending order of the index i and these packets are assigned to the K symbols of the channel considered, according to the following principle:

$$\begin{array}{c} \text{No. of} \\ \text{Symbol} \end{array} \begin{array}{cccc} (q_{l,0}, q_{l,2J-1})(q_{l,2J}, q_{l,4J-1}) \cdots (q_{l,2J(K-1)}, q_{l,2JK-1}) \\ 0 \qquad\qquad 1 \qquad\qquad\qquad\qquad K-1 \end{array}$$

The frequential interlacing consists in assigning the 2J bits of each packet to the J carriers forming the symbol associated with the packet considered. These 2J bits are assembled in J pairs which are bijectively associated with the carriers of the symbol, according to the particular relationship that defines the interlacing.

Figure 6:
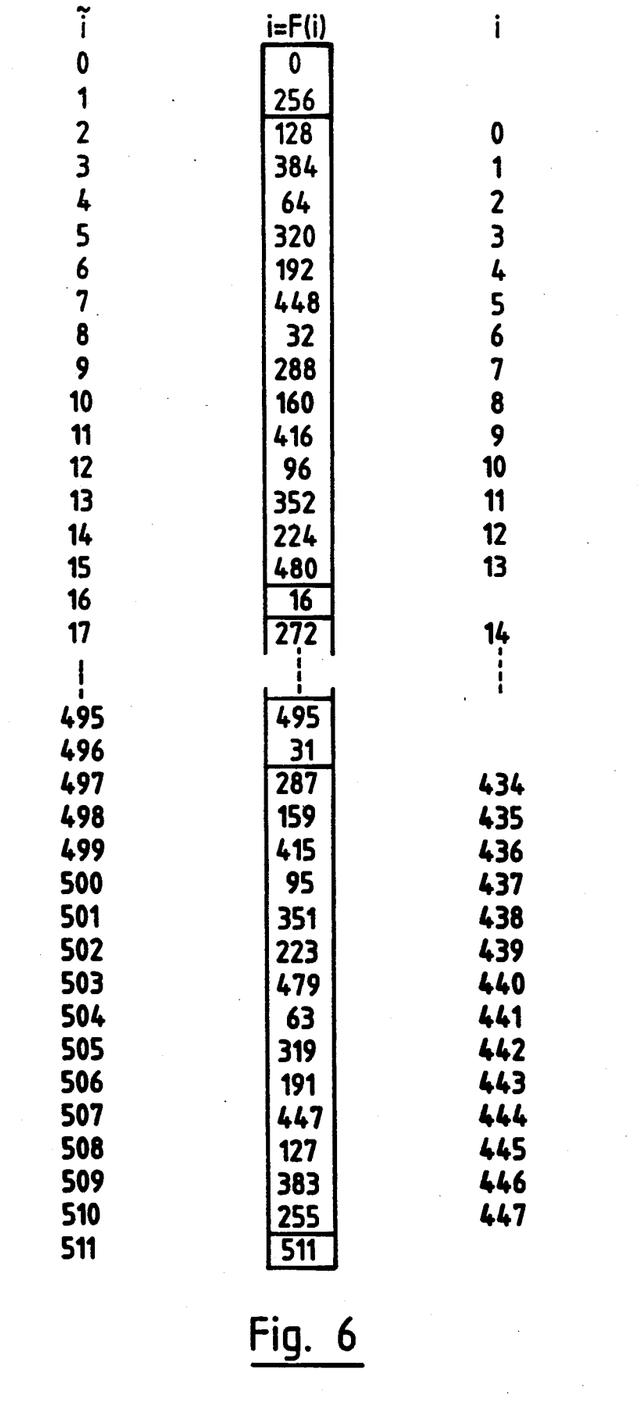
FIG. 6 illustrates an advantageous mode of a shuffling of frequency indices compatible with the frequential interlacing of the chain of FIG. 4.

An example of frequential interlacing is illustrated in FIG. 6 wherein:

i represents the index of the elements of the sequence that have undergone the temporal interlacing 41 and are introduced in the frequential interlacing module 42;

$\tau$ represents the index of the elements after frequential interlacing 42;

the column $\tau = F(i)$ illustrates the implementation of the interlacing function by inversion of bits on the indices of the 512 carrier frequencies forming each multiplex.

It will be noted that each elementary symbol of modulation is formed by a selection of 448 carriers forming a sub-set of the set:

$\{f_j = f_0 + jDf\}(j=0$ to $511)f_o$ designates an arbitrary frequency and Df the difference between each carrier.

This sub-set is the set of carriers $f_j$, the index j of which meets the condition (1):

$$3 \leq j \leq 480, j \neq 256 \qquad (1)$$

This choice is warranted by constraints related to the feasibility of certain analog functions of the receiver. The elimination of the central carrier overcomes the problem of the continuous drift of the analog digital circuits, and the elimination of the lateral carriers of the spectrum ($\frac{1}{8}$ of the total spectrum) overcomes the edge effects of the cut-off filters.

Let j be the $i+1^{th}$ number meeting the condition (1) in the list of the indices 0 to 511 classified in their reciprocal ascending order. This relationship defines the function $j = F(i)$. The frequential interlacing is characterized by by the relationships:

if $E(i/448)$ is an even value, then $u_{j,k} = q_{l,i}$
if $E(i/448)$ is an odd value, then $v_{j,k} = q_{l,i}$
with $i=0$ to 8 063, $k = E(i/896)$ and $j = F(R(i/448))$
and with $E(p/q)$: integer part of $p/q$.
$R(p/q)$: remainder of the division of p by q.

In these relationships, $(u_{j,k}, v_{j,k})$ designates the couple of binary elements determining the phase of the carrier $f_j$ of the order k symbol. (Each carrier undergoes a four phase state modulation).

In other words, each of the pairs of binary elements is formed by the digital elements source sequence in forming packets of 2M constituent elements in said sequence, and in associating the elements two by two in each packet according to a criterion of maximization of dispersal of the adjacent digital elements of the source sequence. The pairs of digital elements are formed by splitting each of the data packets into two half-packets and by matching the same order digital elements in each half-packet.

According to an essential characteristic of the invention, provided that the temporal interlacing function F and the frequential interlacing function G are appropriately chosen with respect to each other, the de-interlacing operation is done implicitly by the application of the combined function $(GoF)^{-1}$. This results, firstly, from the simplicity of synchronization described further above, which enables the implicit obtaining of the sequence received from the transmission channel 43 with immediate knowledge of the index of the symbols in the sequence and, secondly, the complementarity of the two functions of temporal interlacing and frequential interlacing.

The reconstruction of the blocks $Q_l$ is then done very simply in the de-interlacing module in using the bijective character of the frequential interlacing. With the receiver using a differential demodulation, the data are restored without any problem of phase ambiguity.

The principle of the temporal de-interlacing 45 consists in the application, to the binary elements of each block $Q_l$, of the complementary delay with respect to the depth of the interlacing of the delay undergone at transmission. The knowledge of this complementary delay is expressed by $m - f(i) - 1$, and is deduced directly from the index i of the binary element and a priori knowledge of the function $f(.)$. No synchronization other than that of the multiplex itself is needed to do the de-interlacing.

The diagram of FIG. 4 shows this mechanism for a single symbol of modulation.

Should the channel decoder work in soft decision mode, the de-interlacing is actually applied not to binary elements but to words (generally four-bit words) representing the estimation, by the demodulator, of the bits received.

As mentioned further above, the blank symbol 24 of the frame header 21 can be used to identify and characterize the jamming of the transmission channel, and to take it into account in the restoration of the signal received notably within a soft decision decoding process.

Figure 7:
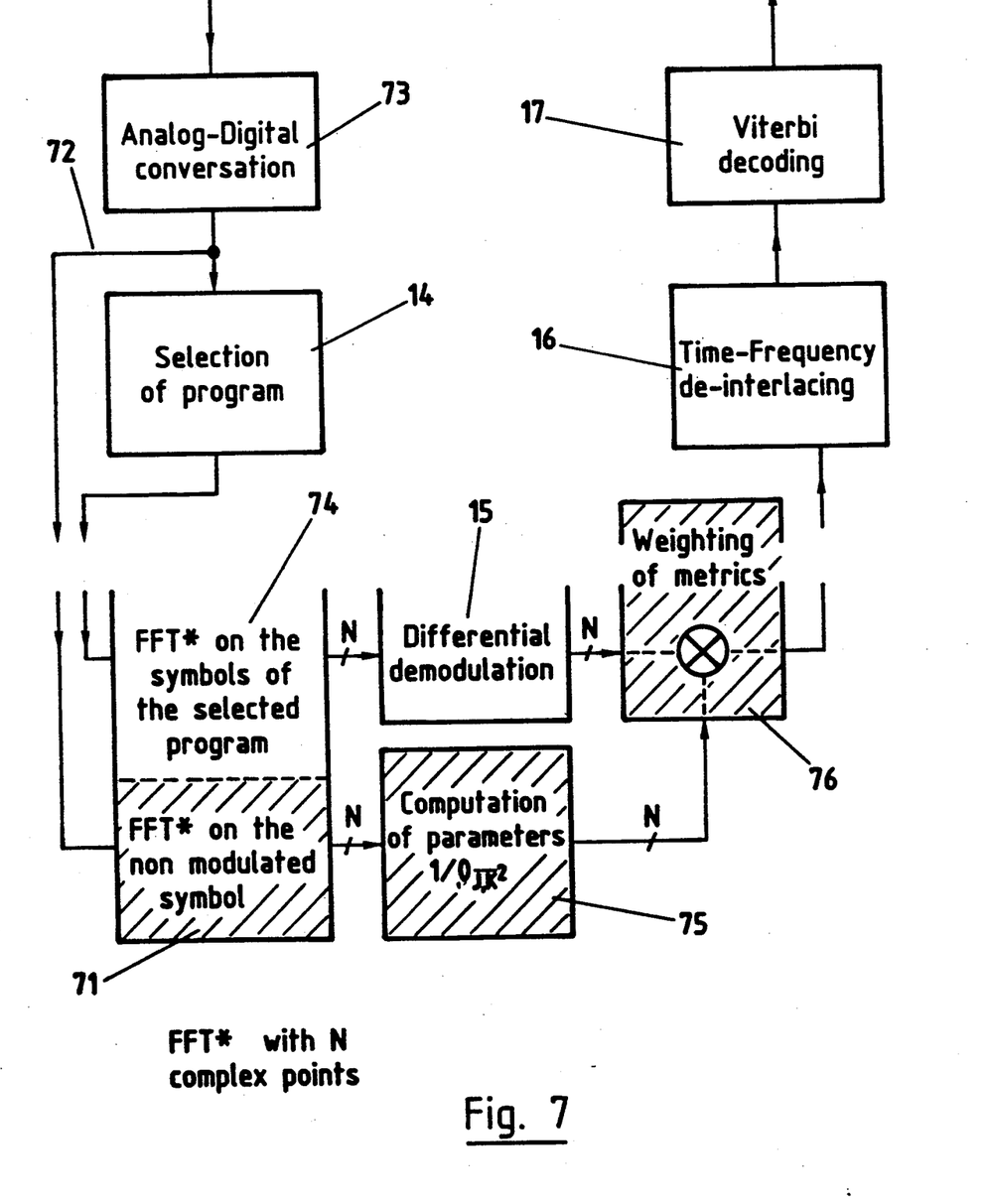
FIG. 7 gives a schematic view of a reception chain with extraction of jamming, compatible with the high throughput rate digital broadcasting method of the invention.

FIG. 7 shows the reception branch of the transmission system of the invention. The hatched modules therein illustrate the implementation of this supplementary function of taking the jamming into account with respect to the known reception chain of FIG. 1.

The explanation of FIG. 7 first of all requires reminder of the chief characteristics of the signal transmitted in general.

The signal transmitted is formed by a sequence of modulation symbols forming a multiplex of N orthogonal carriers.

Let $f_k$ be the set of carrier frequencies considered with:

$$f_k = f_o + k/T_s, k = 0 \text{ to } N-1$$

where $T_s$ represents the duration allocated to a modulation symbol.

We then define an orthogonal base of elementary signals $\psi_{j,k}(t)$ with $k=0$ to $N-1$, $j = -\infty$ to $+\infty$
$\psi_{j,k}(t) = g_k(t - jT_s)$
with $0 \leq t \leq T_s; g_k(t) = e^{2i\pi f_k t}$
elsewhere: $g_k(t) = 0$.

Let us then take a set of complex numbers $C_{j,k}$ taking its values in a finite alphabet, and representing the signal of transmitted data.

The associated OFDM signal is written:

$$x(t) = \sum_{ji=-\infty}^{+\infty} \sum_{k=0}^{N-1} C_{j,k}\psi_{j,k}(t)$$

In the case concerning this application, and cohesively with the preceding descriptions, the transmitted signals $C_{j,k}$ have a constant modulus. This means, in other words, that each of the carriers of the multiplex undergoes a phase modulation.

The transmission channel can be modelized according to the relationship:

$$Y_{j,k} = H_{j,k}C_{j,k} + N_{j+k}$$

where $H_{j,k}$ is the complex response of the channel at the point (j,k) of the time-space frequency, and $N_{j,k}$ is a complex Gaussian noise with:

$$N_{j,k} = N_{Ij,k} + iN_{Qj,k}$$

and $$E(N_{Ij,k})^2 = E(N_{Qj,k})^2 = \sigma^2_{j,k}$$

where E() represents the mathematical expectation.

It can then be shown that the implementation of a decoding according to a maximum likelihood criterion a posteriori consists in the maximization, on $C_{j,k}$, under the constraint of the code of linkage of the symbols $C_{j,k}$ of the expression:

$$Re(Y_{j,k}H^*_{j,k}C^*_{j,k}/\sigma^2_{j,k})$$

where Re(.) represents the real part of a complex number.

The essential element of this analysis relates to the fact that the noise power $\sigma^2_{j,k}$ at every point (j,k) of the time-frequency space coming into play in the decoding process. When the code linking the elements $C_{j,k}$ is a convolutive code and when the decoder used is a soft decision Viterbi decoder, the knowledge of the noise power generated by the channel and by the reception device therefore forms a major weighting parameter with respect to the optimization of the decoding. This parameter does not come into play in the particular case of a white noise, such that:

$\sigma^2_{j,k} = \sigma^2$, irrespectively of j and k.

However, if a jammer affects the signal, the weighting has the effect of "erasing" the corresponding carriers in varying degrees in the same way as a fading on these same carriers. This property is a specific feature of the COFDM system which makes it extremely attractive in channels highly disturbed by industrial stray signals or noise, the nature of which may be pulsed or recurrent in frequency (localized field of the time-frequency space).

The implementation of this process of measurement and identification of the jamming, then of weighting of the resemblance coefficients consists in performing a spectral analysis of the noise on the empty symbol 21.

This analysis is achieved through a discrete Fourier transform 71 using the digitized signal 72 obtained at the output of an ADC 73.

If $\{f_k\}_{k=0,\ldots,N-1}$ designates the set of carriers used in the COFDM signal, it would appear to be necessary to analyze the noise on a comb of spectral lines, of which $\{f_k\}$ forms a sub-set. Since, furthermore, a Fourier transform is used for the demodulation of the signal proper, the use of the same transform for the spectral analysis 71 of the noise is a technical solution that is perfectly suited to the problem and does not call for the implementation of any additional functions.

This operation should be complemented by a bi-directional filtering in the time-frequency space, the role of which is to provide for a smoothing of this measurement in order to obtain an estimation of the mean value of the weighting parameter.

The computation of the parameter $1/\sigma^2_{j,k}$ (75) gives a complementary piece of information of weighting of the metrics 76 associated with the demodulated symbol and designed to be used in the soft decision decoding step 17 (Viterbi decoding).

What is claimed is:

1. A method for the broadcasting and receiving digital data consisting of a source of binary elements comprising the steps of:

providing a plurality of orthogonal frequency carriers;

convolutively coding said source binary elements to form a series of data elements;

temporally interlacing said series of data elements by selectively delaying at least some of said data elements of the series, no two adjacent data elements in said series being delayed by the same amount;

grouping said temporally interlaced series of data elements in data symbols;

grouping said data symbols in frames of symbols, each frame of symbols beginning with a frame header;

inserting in said frame header a first analog synchronization symbol formed by an interval of silence, said interval of silence having the duration of a data symbol;

frequentially interlacing said data elements by selectively modulating said plurality of orthogonal frequency carriers with the data elements of data symbol, each of said data elements being associated with only one of said frequency carriers;

simultaneously broadcasting all of said modulated frequency carriers, the temporal and frequential interlacing effectively preventing any two adjacent data elements in said series of data elements from being broadcast successively in time on a same frequency carrier receiving the broadcast modulated orthogonal frequency carriers;

detecting an envelope of said first analog synchronization symbol of the header in each of said frames;

setting off a time base for receiver synchronization upon detection of said envelope of said first analog synchronization symbol;

demodulating at least some of said frequency carriers of each of said data symbols to form demodulated data elements;

frequentially de-interlacing said demodulated data elements;

temporally de-interlacing said demodulated data elements; and decoding said frequentially and temporally de-interlaced data elements.

2. A method according to claim 1 further comprising the steps of:

inserting in said frame header a second analog synchronization symbol, said second analog synchronization symbol being formed by an unmodulated multiplex of said plurality of orthogonal frequency carriers, each of said frequency carriers being unmodulated, said second synchronization symbol having the duration of a symbol of the frame;

detecting an envelope of said second analog synchronization symbol; and analyzing said second synchronization symbol so as to reset said time base.

3. A method according to claim 2, wherein said frequentially interlacing step of selectively modulating said orthogonal frequency carriers is accomplished by using a differential modulation method, wherein said step of simultaneously broadcasting includes locking each of said orthogonal frequency carriers into a distinct reference phase, and wherein said step of inserting a second analog synchronization symbol includes the step of associating a phase to each of said unmodulated orthogonal frequency carriers of said second analog synchronization symbol, said associated phase being correlated to said distinct reference phases of said locked orthogonal frequency carriers.

4. A method according to claim 1 wherein said step of frequentially interlacing includes the steps of associating an indice with each of said orthogonal frequency carriers; and shuffling said indices of said orthogonal frequency carriers according to a reversible deterministic function maximizing the dispersal of the frequency carriers associated with adjacent data elements of said series of data elements.

5. A method according to claim 4, wherein said step of shuffling the indices comprises the steps of:

binary encoding each of said indices; and applying a function of the bit inversion type to each of the binary encoded indices, said function of the bit inversion type consisting of reading from right to left a binary encoded indice written from left to right.

6. A method according to claim 1, wherein said convolutively coding step comprises the steps of:

forming packets consisting of a set of consecutive elements from said source of binary elements; and forming said data elements by associating said binary elements two by two in each packet according to a criterion of maximization of dispersal of the adjacent binary elements in said source.

7. A method according to claim 6, wherein said step of forming data elements two by two comprises the steps of:

splitting each of said packets into two half-packets; and pairing the binary elements having the same order in each of said half-packets, the order of a binary element referring to the position of the binary elements in said half-packets.

8. A method according to claim 1, wherein said step of temporally interlacing includes the steps of:

providing an index for each of the data elements, and applying a delay to each data element, the value of each of said delays being determined by an application of a reversible delay function of the index of the data element, and wherein said temporally de-interlacing step includes the step of applying a complementary delay value to each data element, the complementary delay value being determined so that the adding of said delay value to said complementary delay value is equal to the depth of the temporal interlacing, said depth of the temporal interlacing being the maximum value which can be applied by said reversible delay function.

9. A method according to claim 1 further comprising the step of inserting a time delay between each of said symbols of each frame, the duration of said time delay being in the time interval between $T_s/20$ and $T_s/3$, where $T_s$ is the duration of a symbol of the frame, so that any echo effects are absorbed and the intersymbol interference phenomenon is limited.

10. A method according to claim 2 wherein the detecting step further comprises a jamming extraction process including the steps of:

spectrally analyzing said first analog synchronization symbol formed by an interval of silence on the frequency spectrum covered by said plurality of orthogonal frequency carriers;

identifying the frequency carriers affected by said jamming; and correcting the data elements carried by said frequency carriers affected by said jamming.

11. A method according to claim 10, wherein said step of spectrally analyzing includes a step of temporally filtering and a step of frequentially filtering, said filtering steps providing for a smoothing of the results of the analysis on the spectrum covered by said plurality of orthogonal frequency carriers.

12. A method according to claim 10 wherein said step of decoding the de-interlaced data elements is accomplished according to a maximum likelihood algorithm, and wherein said step of correcting the binary elements carried by said frequency carriers affected by said jamming includes the steps of:

detecting the broadcast power of said jamming affecting each of said orthogonal frequency carriers; and controlling the weighting of said maximum likelihood algorithm by means of the broadcast power detected in each of said orthogonal frequency carriers.

13. A method according to claim 10, wherein said step of spectrally analyzing is achieved by performing a discrete Fourier transform on said first analog synchronization symbol.

* * * * *

UNITED STATES PATENT AND TRADEMARK OFFICE
CERTIFICATE OF CORRECTION

PATENT NO. : 5,191,576

DATED : March 2, 1993

INVENTOR(S) : Daniel Pommier and Bernard LeFloch

It is certified that error appears in the above-identified patent and that said Letters Patent is hereby corrected as shown below:

On the title page, insert:    --Priority Data: Continuation application of U.S. Ser. No. 07/439,275, filed Nov. 20, 1989, now abandoned--; and     column 12, line 25, "2" should be --1--.

Signed and Sealed this

Twenty-third Day of November, 1993

*Attest:*

BRUCE LEHMAN

*Attesting Officer*    *Commissioner of Patents and Trademarks*